United States Patent
Swanburg

(10) Patent No.: US 7,970,111 B2
(45) Date of Patent: Jun. 28, 2011

(54) INTERACTIVE COMMUNITY OF INTEREST PROFILE

(75) Inventor: Scott Allen Swanburg, Duluth, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1335 days.

(21) Appl. No.: 11/514,128

(22) Filed: Sep. 1, 2006

(65) Prior Publication Data
US 2008/0077529 A1    Mar. 27, 2008

(51) Int. Cl.
*H04M 11/00* (2006.01)
(52) U.S. Cl. ............. 379/90.01; 379/93.25; 379/93.15
(58) Field of Classification Search ............. 379/90.01, 379/93.02–93.07, 93.15, 93.17, 93.25; 705/14.27, 705/319; 455/466; 380/91.3; 342/357.09
See application file for complete search history.

(56) References Cited

U.S. PATENT DOCUMENTS

| | | | |
|---|---|---|---|
| 6,333,919 B2 | 12/2001 | Gaffney | |
| 2002/0106066 A1* | 8/2002 | Swanson et al. | 379/196 |
| 2002/0145561 A1* | 10/2002 | Sandhu et al. | 342/357.09 |
| 2003/0087652 A1* | 5/2003 | Simon et al. | 455/466 |
| 2005/0132033 A1* | 6/2005 | Russo et al. | 709/223 |
| 2005/0171955 A1* | 8/2005 | Hull et al. | 707/10 |
| 2005/0172001 A1* | 8/2005 | Zaner et al. | 709/205 |
| 2005/0267766 A1 | 12/2005 | Galbreath et al. | |
| 2006/0058045 A1* | 3/2006 | Nilsen | 455/456.5 |
| 2006/0135264 A1 | 6/2006 | Shaw et al. | |
| 2006/0190536 A1 | 8/2006 | Strong et al. | |
| 2006/0190829 A1 | 8/2006 | Zaner et al. | |
| 2006/0240852 A1* | 10/2006 | Al-Sarawi | 455/466 |
| 2007/0233736 A1* | 10/2007 | Xiong et al. | 707/104.1 |

* cited by examiner

*Primary Examiner* — Melur Ramakrishnaiah
(74) *Attorney, Agent, or Firm* — Moazzam & Associates, LLC

(57) ABSTRACT

A system for generating and working with communities of interests is disclosed. In various forms, the present system allows multiple users sharing common interests to interact with each other seamlessly, seek out times when each is available, and other such convenience functions.

21 Claims, 5 Drawing Sheets

INTERACTIVE COMMUNITY OF INTEREST PROFILE

BACKGROUND OF THE INVENTION

1. Field of the Invention

The present invention relates to social communities. More particularly, the present invention relates to ways for users of mobile devices to discover others with similar interests, to form social communities with those people, and to seamlessly interact with other members of a social community regardless of the hardware and software each member may be using.

2. Background of the Invention

Mobile devices have become ubiquitous in today's society. Many people have abandoned traditional "land-line" telephones in favor of mobile telephones and devices. Others plan their daily lives using personal digital assistants (PDAs). These devices grant people the opportunity to connect with others in ways not possible before.

However, despite the advances in technology, connecting with others who share common interests remains difficult. A user must first locate one or more other people who share common interests. The devices she owns will not be able to do this for her, or to help her in any significant way, so she must look for others on her own. Users can search online services for groups sharing her interests. However, these groups will not be able to dynamically share content with her or her devices. These groups are generally limited to interacting via fixed landline devices, over the Internet, with limited access to information with their community in a mobile context. This prevents a user from making full use of the advantages offered by mobile networks and associated mobile devices.

Even if the user manages to somehow find a group of people who shares common interests, interacting with the group is difficult with conventional technology. For example, a marathon runner may wish to share videos of her finishing a race with others in her group. However, present technology makes such sharing difficult. The user could burn the video onto a DVD and send it to the other members of the group. However, this is expensive and time-consuming. The user may wish to send the video directly from her mobile device to the devices of the other members. Present technology does not provide the user with a way of knowing which of her members is capable of receiving or viewing the video. Further, if one member uses a different video format, the user would have to first translate the video into a format compatible with that member's device prior to sending the video to that member.

Present technology also presents difficulties for people wishing to interact across platforms. Applications running on mobile devices, personal computers, or Internet protocol enabled entertainment devices (such as IP-enabled digital video recorders) operate using different platforms and protocols. It is difficult for a user using one platform or application to interact with other users or other applications on different platforms.

Conventional technology does not permit a user to interact seamlessly with others users across a network. What is needed is a way for users to discover, create or enhance social communities of users who share at least one common interest. What is further needed is a way for members of social communities to interact with one another through any network regardless of the functionality of each user's devices or whether the network is fixed or mobile.

SUMMARY OF THE INVENTION

Conventional techniques for creating, joining and enhancing social communities across multiple network access points are inefficient and inconvenient. Such techniques require a user to discover a social community by himself, a difficult and time-consuming task. Further, even if a user manages to find a social community, interacting with members of the community is difficult because other users' devices may not share the same capabilities as the device the user herself operates. This inhibits the creation of social communities and limits the possibilities inherent in a mobile environment.

The present invention addresses the shortcomings of conventional devices as well as network access and presents opportunities for users of mobile devices to discover others with similar interests, to form social communities with those people, and to seamlessly interact with other members of a social community regardless of the hardware and software each member may be using.

In one exemplary embodiment, the present invention is an interactive community of interest profiling system. The system has a profile generation component which can generate a profile of a user. A social community discovery component can discover existing social communities or create a new social community based on that profile. A social community registration component registers a user with a social community discovered by the discovery component. Finally, social community multimedia reception and transmission components receive or transmit multimedia from or to other members of the social community.

In another exemplary embodiment, the present invention is an interactive application system. An interactive application component permits a plurality of applications to interact and communicate with each other according to the needs of a user, regardless of the platform the application runs on or its location in a network. A social profile generation component monitors the user's interactions with the plurality of applications and generates a social profile of a user based on the user's interactions with the applications. A social community discovery component discovers social communities with interests common to the user based on the profile generated by the social profile generation component. A social community registration component registers the user with a social community discovered by the social community discovery component. The plurality of applications interacts with each other, users, and applications belonging to other users of a social community through the interactive software component.

DETAILED DESCRIPTION OF THE INVENTION

The present invention provides for an interactive community of interest profile, permitting users to create and join social communities and then to interact seamlessly with members of the social community regardless of platform or location on the network. In the examples and embodiments described herein, the interactive community of interest will refer to applications and components stored in mobile telephones. However, the applications may be stored in other devices. The applications could be stored in other mobile devices (such as personal digital assistants), personal computers (including laptop or desktop personal computers), Internet Protocol enabled digital entertainment devices or in network servers.

Figure 1:
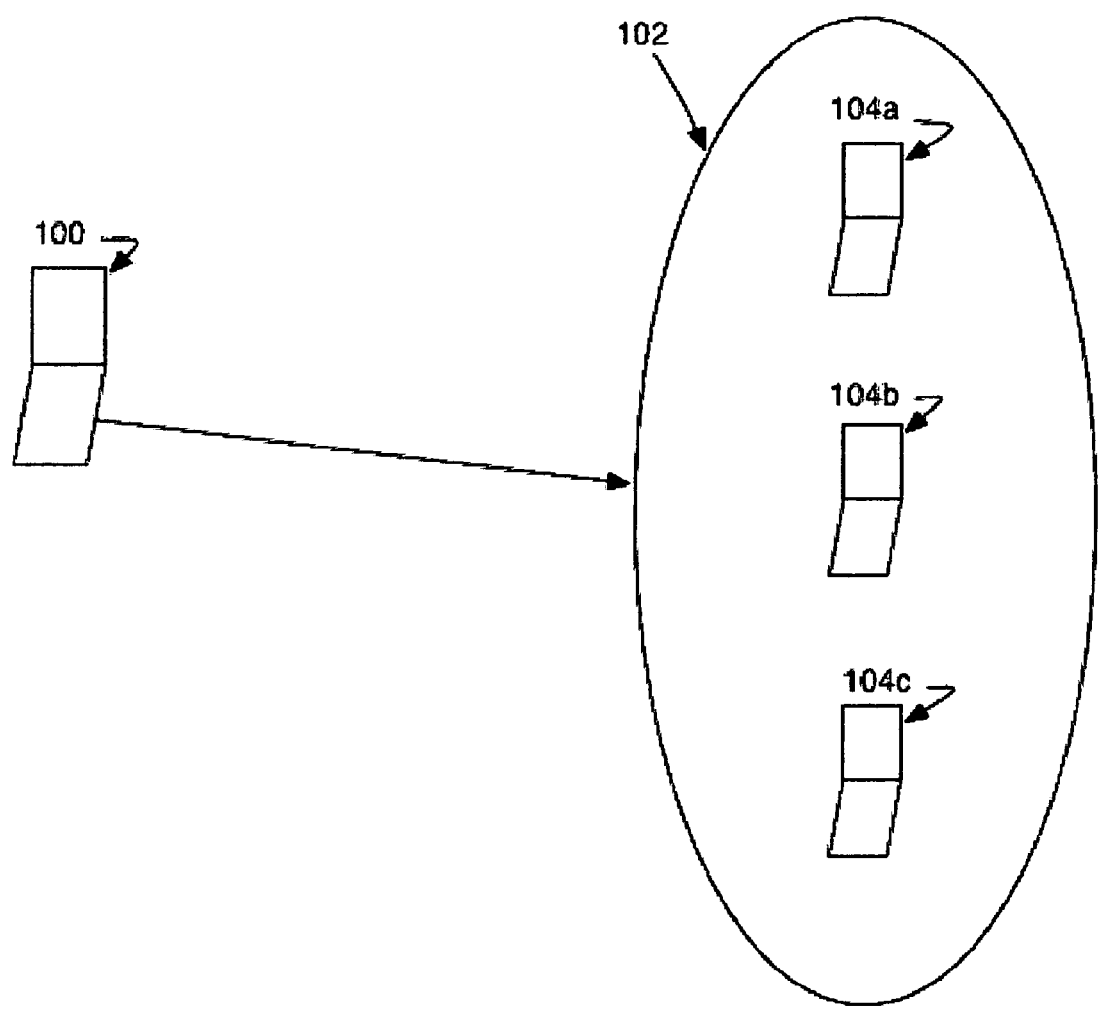
FIG. 1 shows a user communicating with a social community according to an exemplary embodiment of the present invention.

An overview of a first exemplary embodiment of the present invention is shown in FIG. 1. FIG. 1 shows social community 102. Users 104a, 104b, and 104c (represented by the respective device each user is using) are members of social community 102. As shown, user 100 is not a member of social community 102. However, user 100 may take advantage of the present invention to seek out and join social community 102, as shown by the arrow. Once user 100 has joined social community 102, the present invention permits the user to seamlessly interact with other members of social community 102 and enhance her mobile experience.

User 100 may seek out and join social community 102 by any number of ways. For example, user 100 could search for a social community using a web portal. The user could also search for a social community through her mobile telephone. These methods are exemplary; the user could use any technique to seek out social community 102. In fact, the user need not actively seek out a social community with which to join. The community of interest profile could do it for the user based on an interactive user profile 302 (shown in FIG. 3 and discussed below).

Figure 5:
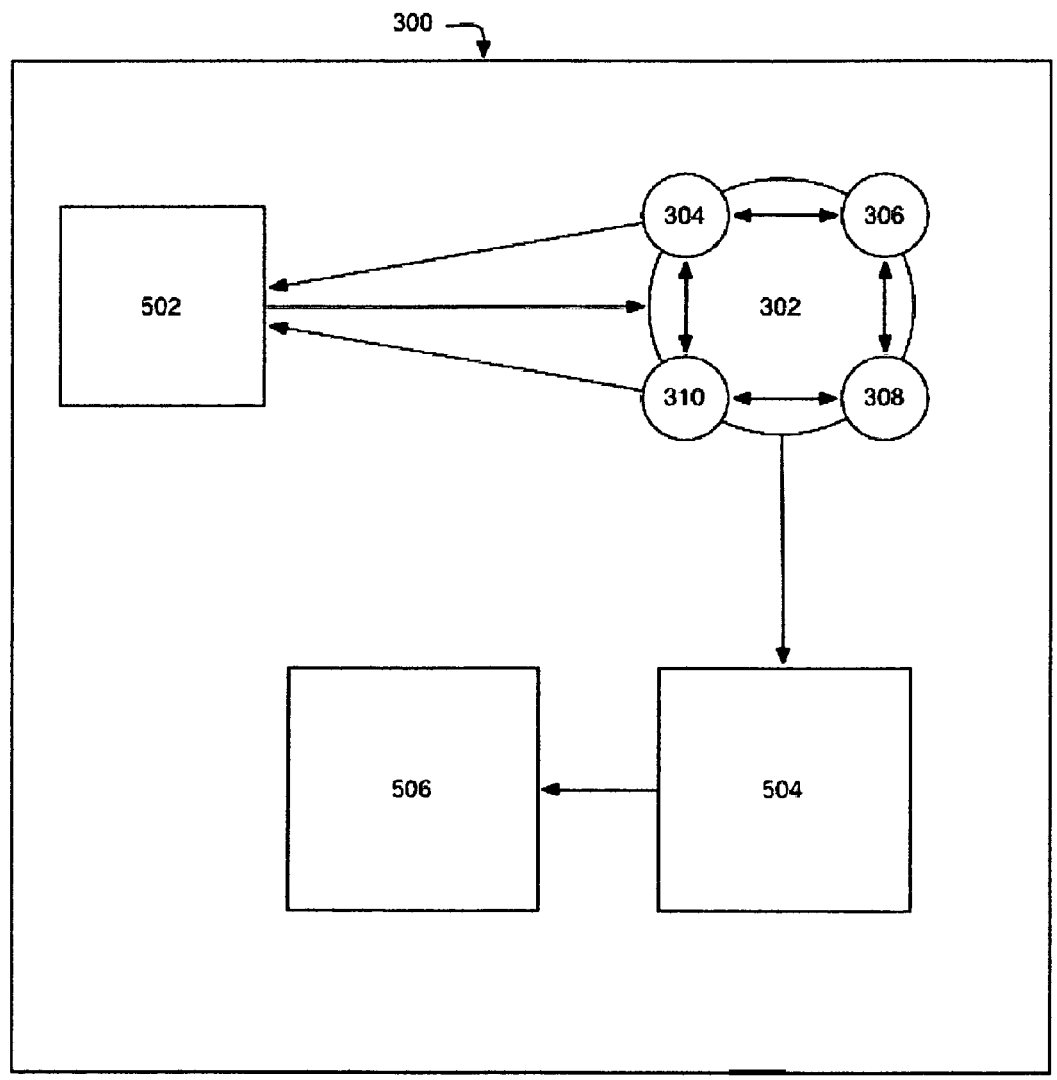
FIG. 5 shows another view of the interactive application component shown in FIG. 3, with additional components related to generating a social profile and using the social profile to discover and register with social communities according to an exemplary embodiment of the present invention.

In another exemplary embodiment of the present invention, users 100, 104a, 104b, and 104c have an interactive user profile 302 containing information about the user's interests, as shown in FIG. 5. This profile could be generated in any number of ways. For example, a social profile generation component 502 stored in user 100's mobile device or in a network component such as a network server, could monitor the applications and services user 100 chooses to avail himself of. If the user often looks at baseball scores, the social profile generation component 502 could conclude that user 100 has an interest in baseball and add this to user 100's social profile. Alternatively, the user could enter information into the social profile generation component 502, which the social profile generation component can then use to generate interactive social profile 302. The social profile generation component 502 may generate the profile through the above techniques or through a combination of the above techniques or through other techniques similar to the above, such other methods still being within the scope of the present invention.

Once the social profile generation component 502 has enough information to generate a profile, a social community discovery component 504 and a social community registration component 506 can use the interactive user profile 302 to find a social community 102 with members sharing user 100's interests and to register user 100 with social community 102. The social community registration component 506 could automatically register user 100 with social community 102. The social community registration component 506 could serve user 100 with a list of social communities that the social community discovery component 504 has discovered. User 100 may then select which social community to join, such as social community 102.

Registering user 100 with social community 102 can be done in any of a number of ways. The registration process could be automatic. Once either the user 100 or the social community registration component 502 determines that user 100 shares interests with social community 102, the social community registration component automatically registers user with social community 102. Social community registration component 506 or user 100 could also send a message to one or more members of social community 102 requesting membership. If the social community registration component 506 receives a reply message granting permission to join social community 102, social community registration component 504 registers user 100 with social community 102.

Figure 2:
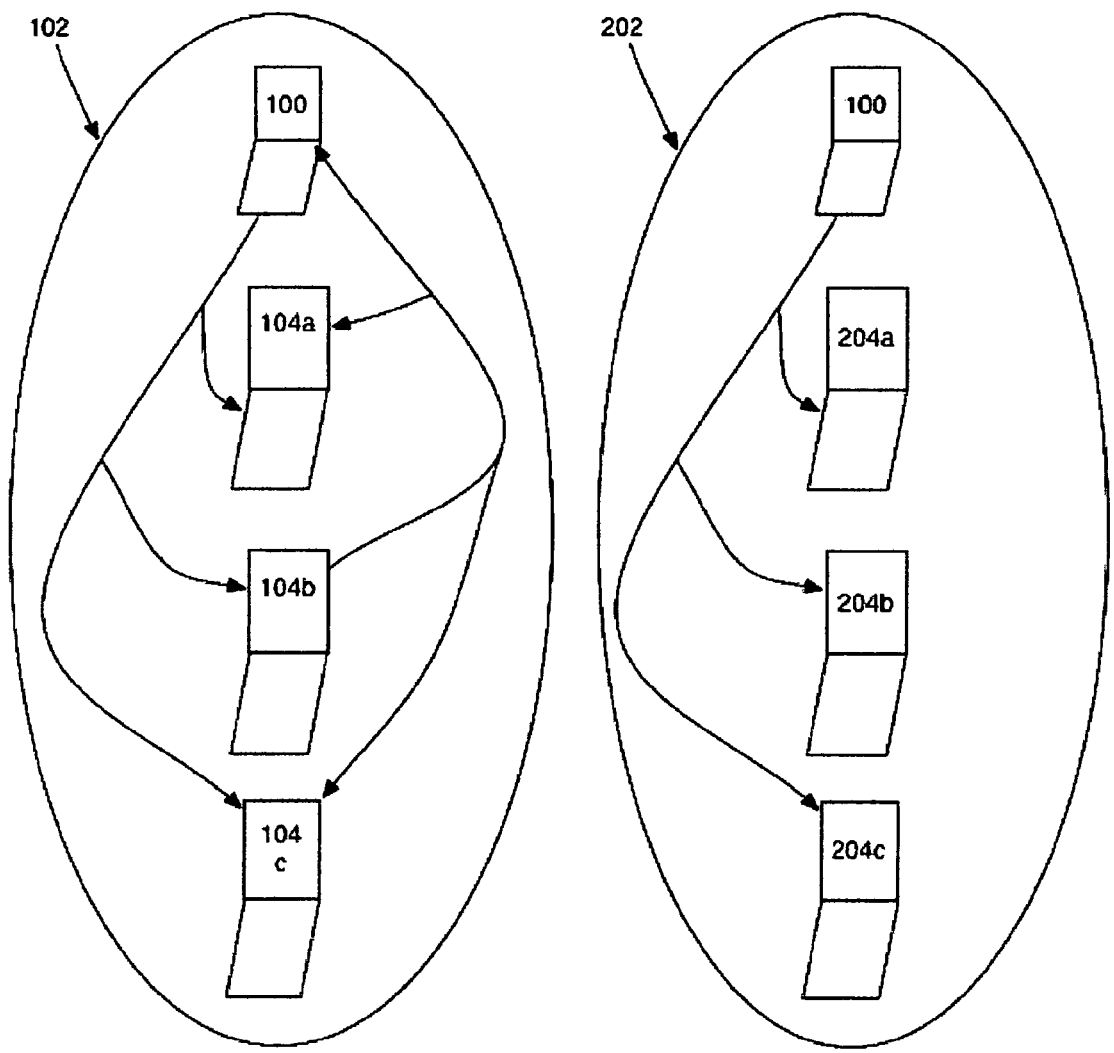
FIG. 2 shows members of a social community seamlessly interacting with each other according to an exemplary embodiment of the present invention.

FIG. 2 shows two social communities, social community 102 and social community 202. User 100 is a member of both social community 102 and social community 202. Users 104a, 104b, and 104c are members of social community 102. Users 204a, 204b, and 204c are members of social community 202. Using the present invention, each member of a social community may interact with other members of the same social community and send each other multimedia (such as audio or video) regardless of what platform each user is using (such as mobile phone, personal computer, or Internet protocol enabled entertainment device) or each user's location on a network. As a result, users remain in contact with each other and enhance their mobile experience. For example, user 100 could share video clips with users 104a, 104b, and 104c, as shown by the arrows connecting user 100 with users 104a, 104b, and 104b. Similarly, user 104b could share her contact list with users 100, 104a, and 104c, as shown by the arrows connecting user 104b with users 100, 104a, and 104c. The interaction between the users 100, 104a, 104b, and 104c occurs seamlessly, regardless of what platform or network each user is using.

In another example, user 100 is interested in triathlons. At first, user 100 is not a member of any social community, as shown in FIG. 1. She utilizes a social profile discovery component to look for existing social communities of other people interested in triathlons. User 100 could accomplish this in a number of ways, such as through user 100's mobile device or through a web portal. Once she discovers a social community 102 compatible with her interests, she sends a message to one or more members of social community 102 requesting to join. If the members agree, user 100 joins social community 102, as shown in FIG. 2. In a similar fashion, user 100 may also join social community 202. Social community 202 could, for example, comprise user 100's college friends.

As a member of social community 102, user 100 now has the ability to communicate seamlessly with other members of social community 102. To continue the example, social community 102 may be training for an upcoming breast cancer triathlon. Members of social community 102 exchange real time locations, race routes, and contact lists with each other to assist in the training. User 104b could send users 100, 104a, and 104c information specifically related to her mobile context including a map of the race route, shown by the arrows from user 104b to users 100, 104a, and 104c. This information could be attached to messages sent to users 100, 104a, and 104c or it could be sent separately. In addition, as a member of social community 102, user 100 can send information to other members from any device user 100 has, whether it be a mobile device, laptop computer, or Internet protocol enabled entertainment device.

During the breast cancer triathlon, user 100 wishes to send a real time video stream of her teammates to her friends in social community 202 from her mobile device. A social community multimedia transmission component automatically determines which members of social community 202 are capable of receiving the video clip and notifies user 100 of those members. User 100 selects the members to whom she wishes to send the video clip and social community multimedia transmission component transmits the clip to the selected viewers, shown by the arrows connecting user 100 with users 204a, 204b, and 204c If any translation or formatting is required to format the clip into a format viewable by a particular member, the social community multimedia transmission component automatically performs any translation or formatting required. In this fashion, user 100 can send multimedia to any member of social community 202 without being concerned about how the video is to be received. Through seamless interaction with other members of social community 202, user 100's social networking experience is expanded and enhanced, maximizing the capabilities of mobile networks.

Figure 3:
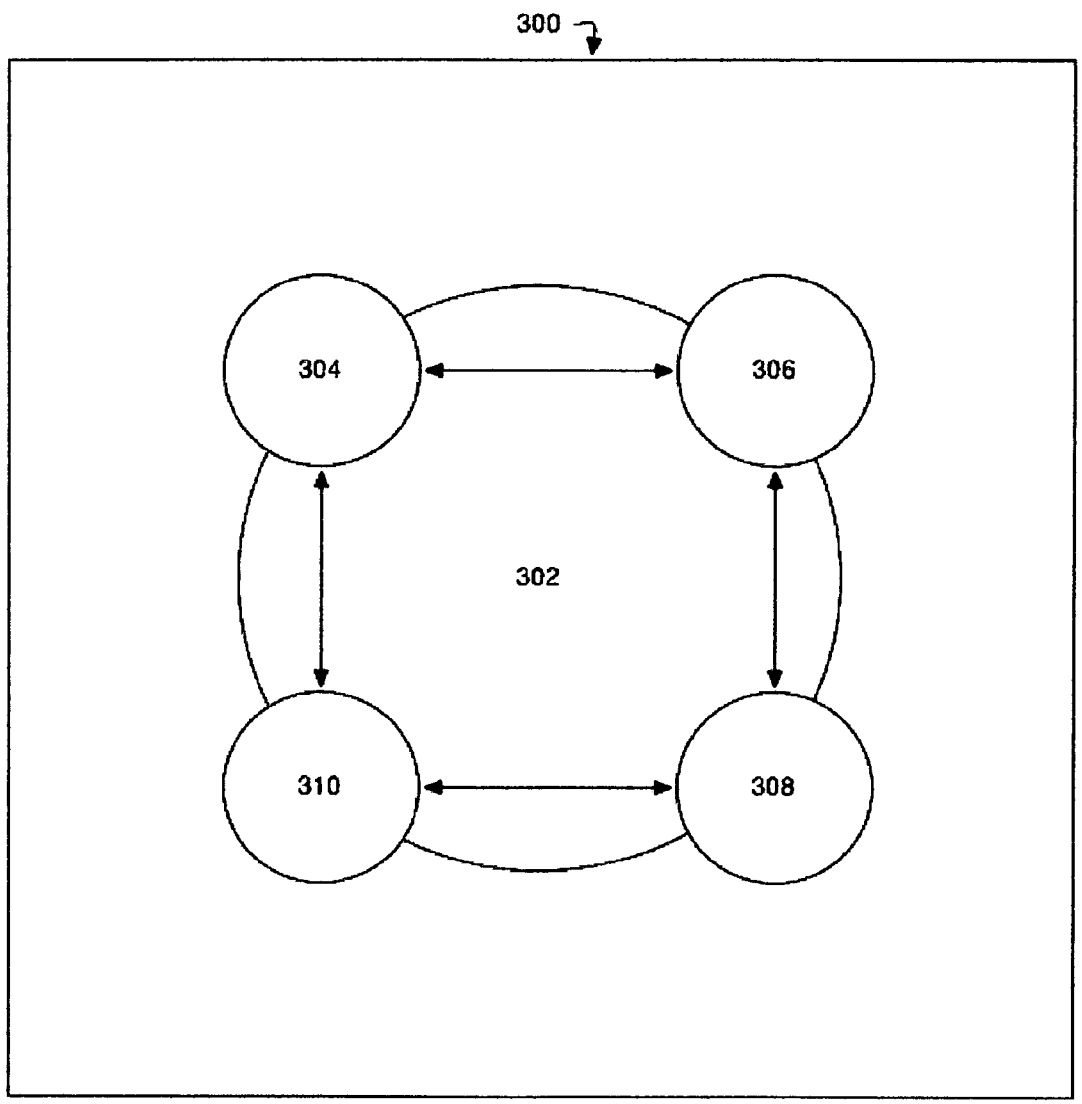
FIG. 3 shows multiple applications interacting with each other in the interactive application environment according to an exemplary embodiment of the present invention.

In another exemplary embodiment, FIG. 3 shows a view of interactive application component 300. Interactive application component 300 is a software foundation that permits applications 304, 306, 308, and 310 to interact with each other regardless of platform or network. In addition, interactive application component 300 permits user 100 to dictate how applications 304, 306, 308, and 310 interact. This permits user 100 to customize his applications and in so doing enhance his mobile experience. FIG. 3 shows interactive user profile 302 interacting with applications 304, 306, 308, and 310.

For example, application 304 could be a calendar program and application 306 could be a music player application. User 100 can coordinate calendar program 304 and music player application 306 to play the user's favorite song as a "wake-up call" in the morning. In the morning, calendar application 304 accesses application 306 and directs application to play the selected song. In selecting which song to play, user 100 could dictate what song to play, or music player application could determine the users favorite song by consulting interactive user profile 302.

Interactive application component 300 contains interactive user profile 302. Interactive user profile 302 is a profile of the user 100, comprising user 100's interests or any other information about user 100. For example, interactive user profile 302 could contain information on user 100's favorite song, hobbies, sports teams, or the like. Interactive user profile could also contain personal information on user 100, such as user 100's name and address.

Interactive user profile 302 may be created by monitoring user 100's interactions with applications and services over time. This monitoring can occur through monitoring "trigger points" in each application 304, 306, 308, and 310. Monitoring these trigger points creates a pattern of usage. This pattern of usage can then be correlated with the particular applications 304, 306, 308, and 310 to create interactive user profile 302. Interactive user profile 302 could be stored in any location. It could be stored, for example, on user 100's mobile device. It could also be stored on a personal profile data repository accessible by any of user 100's devices, including his mobile device, personal computer, or Internet protocol enabled digital entertainment device.

The monitoring may be performed by social profile generation component 502, shown in FIG. 5. FIG. 5 shows an expanded view of interactive application component 300, also shown in FIG. 3. Interactive software component 300 may include social profile generation component 502, social community discovery component 504, and social community registration component 506 in addition to interactive user profile 302 and applications 304, 306, 308, and 310.

Social profile generation component 502 monitors applications 304, 306, 308, and 310, shown by the arrows connecting applications 304 and 310 with social profile generation component 502. For sake of clarity arrows indicating social profile generation component 502's monitoring of applications 306 and 308 are not shown. Nevertheless, social profile generation component monitors applications 306 and 308 as well as applications 304 and 310.

User 100's interactions with applications 304, 306, 308, and 310 will, over time, permit social profile generation component 502 to draw conclusions about user 100's interests. Once social profile generation component 502 concludes that user 100 has a particular interest, social profile generation component updates interactive user profile 302 to reflect this interest. Later, social community discovery component 504 uses interactive user profile 302 to discover social communities sharing user 100's interests. Social community discovery component 504 passes the social communities it has discovered to social community registration component 506. Social community registration component 506 may then register user 100 with those social communities using any of the techniques described herein.

Social profile generation component 502, social community discovery component 504, and social community registration component 506 could be located at any point in the network. For example, at least one of the components (and possibly all three) could be stored on a network server. Storing the components on a network server would permit the components to interact with existing social communities, such as those created by Internet Service Providers (ISPs). The present invention would extend these existing social communities into the mobile world, enhancing their value to the user.

For example, application 304 could be a sports monitoring application that permits user 100 to follow particular sports teams (such as the Washington Nationals) and receive updated score alerts. The selection of the particular sports team to follow may be a "trigger point" for monitoring in application 304. As the baseball season goes on and user 100 continues to receive scores from Washington Nationals games, social profile generation component 502 can conclude that user 100 is a fan of the Washington Nationals. Social profile generation component 502 then updates user 100's interactive user profile 302 with this information. Later, social community discovery component 504 can use the information in interactive user profile 302 to find social communities dedicated to following the Washington Nationals.

In another example, application 306 could be a video player application and application 308 could be a multimedia messaging service (MMS) application. Social profile generation component 502 notices that, over a period of time, user 100 uses video player application 306 to watch a wide variety of video clips. However, when video player application 306 interacts with MMS application 308, it is most often to send clips of The Daily Show with Jon Stewart to user 100's friends. Interactive social profile 302 can then be updated to reflect user 100's interest in The Daily Show. Since user 100 repeatedly views clips of The Daily Show with video player 306 and forwards those clips to friends using MMS application 308, it is likely that user 100 is a fan of The Daily Show.

FIG. 5 shows social community discovery component 504 and social community registration component 506 as distinct components. Social community discovery component 504 and social community registration component 506 could, optionally, be part of one larger component. The two components could also be part of social profile generation component 502. The two components could also be one of the applications 304, 306, 308, and 310.

Figure 4:
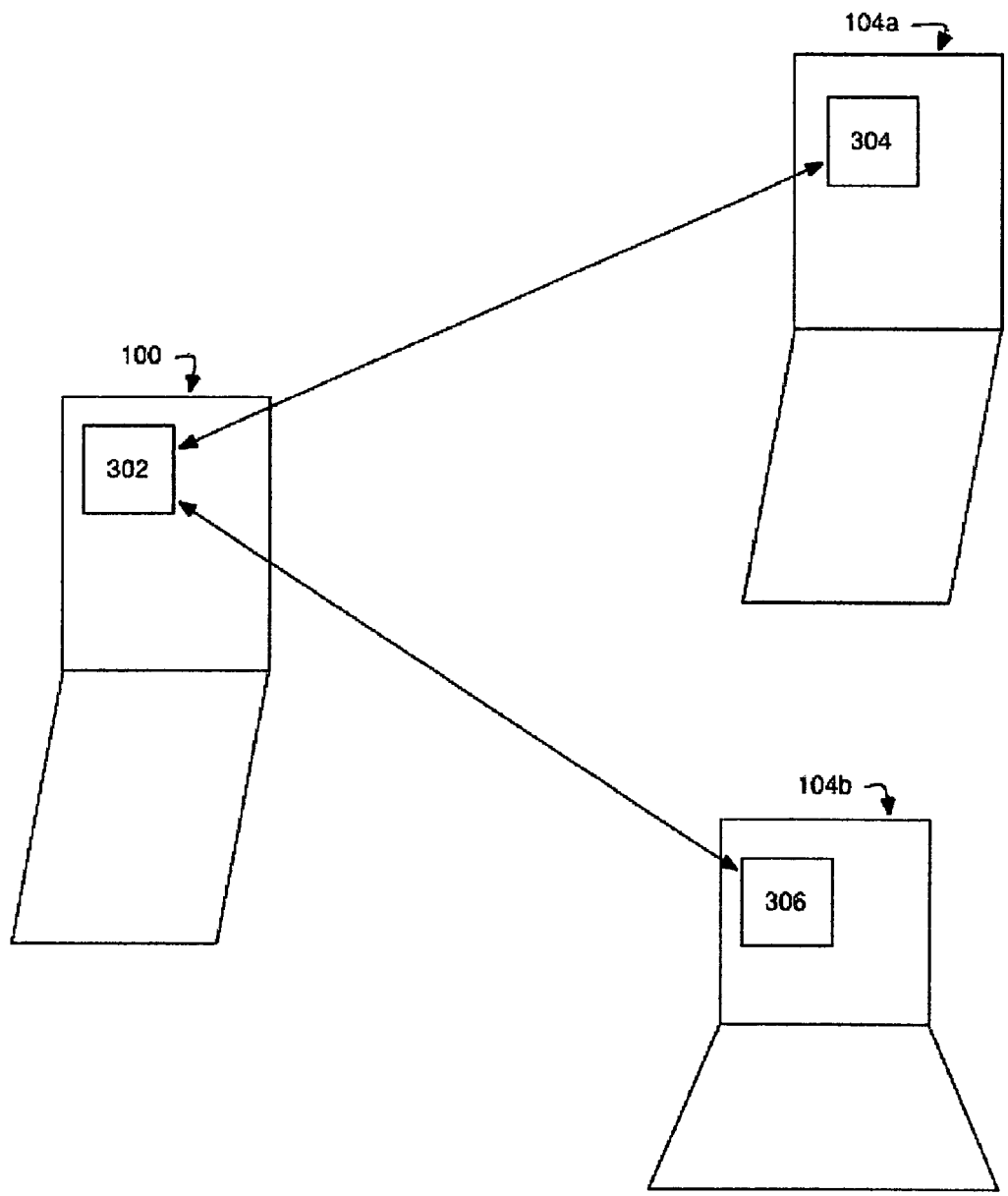
FIG. 4 shows multiple users using different devices interacting with one another according to an exemplary embodiment of the present invention, despite having multiple applications running on different devices and platforms.

In another exemplary embodiment, FIG. 4 shows users 100, 104a, and 104b interacting with each other through applications 302, 304, and 306. Here, unlike in the immediate above exemplary embodiment, applications 304, 304, and 306 are not necessarily associated with the same user. User 100 interacts with application 302, user 104a interacts with application 304, and user 104b interacts with application 306.

In FIG. 4, users 100 and 104a are interacting with each other using mobile devices through a wireless network. However, user 104b is interacting with user 100 with a personal computer through another network, possibly a combination of a broadband "land-line" network and a wireless network. Despite the multiple architectures and networks, the present invention according to the present embodiment permits the users 100, 104a, and 104b to interact with each other seamlessly. This enhances the social networking experience of users 100, 104a, and 104b because they do not need to worry about what platforms or networks the other users are using.

The present embodiment could be used to facilitate online gaming. Users 100, 104a, and 104b may all be players of a particular online game. Based on their history of playing this online game, their interest in the online game was added to their interactive user profile. Users 100, 104a, and 104b joined or created social community 102 based on their respective interactive user profiles. In this example, social community 102 is a community of users interested in the particular online game users 100, 104a, and 104b are interested in. Users 100, 104a, and 104b may have joined social community 102 voluntarily or automatically, or by any other technique, such as those described above.

Once users 100, 104a, and 104b are members of social community 102, they may use the present invention to enhance their social network experience by easily connecting with each other to play their online game. A social community management component can keep track of each member of social community 102 and notify user 100 whenever users 104a or 104b are online and available to play the online game. If users 104a and 104b are online, the social community management component can interact with an instant messaging application to permit user 100 to send instant messages back and forth between users 104a and 104b.

At an earlier point in time, interactive application component 300, in conjunction with interactive social profile 302, may have determined that user 100 often switches to the online game after communicating with users 104a or 104b. Interactive application component 300 then can create a connection between the instant messaging component and the online game so that user 100 can switch seamlessly between the two without having to first close the instant messaging application.

Once users 100, 104a, and 104b have agreed to play the online game, user 100 uses the existing connection between the instant message program and the online game to immediately open the online game and play with users 104a and 104b. Users 104a and 104b may use different platforms or networks to interact with user 100. Interactive software component 300 automatically performs any formatting or translation required to interact with users 104a and 104b, despite being on different platforms. To user 100, the experience occurs seamlessly. He has no knowledge of the different platforms or networks used by users 104a and 104b and he does not need to worry about connecting to them, since interactive software component handles the connection automatically. User 100's social network experience is thus enhanced through the seamless interaction offered by interactive software component 300.

The above examples presented single scenario circumstances where one user is linked to a single community with common interests. However, it should be noted that a single user may be linked to many user communities or social circles such that the interaction between the individual and such communities or circles are more complex than the simple examples presented above. In a real time situation, a single user may be interacting with multiple users in differing communities at the same time.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An interactive community of interest profiling system stored on a non-transitory computer readable medium, the system comprising:

a social profile generation component for generating a profile of a user;

a social community discovery component to discover existing social communities and if a social community does not exist, then to create a new social community based on said profile generated by said profile generation component, the creation of the new social community further being based in part upon interactions of a plurality of users using a plurality of applications;

a social community registration component to register a user of a mobile device with the social community created by said discovery component;

a social community multimedia reception component for receiving multimedia from other members of said social community registered by said registration component; and a social community multimedia transmitting component for transmitting multimedia to other members of said social community.

2. The system of claim 1, wherein the social community discovery component and the social community registration component are accessed through a web portal.

3. The system of claim 1, wherein the social community discovery component and the social community registration component are accessed through said user's mobile device.

4. The system of claim 1, wherein the social community registration component registers said user of a mobile telephone with said social community by sending a registration request message to at least one existing member of said social community and registering said user with said social community if the social community registration component receives a reply message from said existing member granting permission to register said user with said social community.

5. The system of claim 1, wherein the social community registration component presents said user with a list of social communities discovered by said social community discovery component and said user selects which social community the social community registration component shall register said user with.

6. The system of claim 1, wherein the multimedia received or transmitted by said social community multimedia transmitting unit and said social community multimedia receiving unit is at least one of a real time location, a contact list, audio, video, or image.

7. The system of claim 1 wherein the social community multimedia transmitting component automatically translates said multimedia into a format usable by a member of said social community prior to transmitting said multimedia to said user.

8. An interactive application system stored on a non-transitory computer-readable medium, the system comprising:
  a plurality of applications;
  an interactive application component permitting said plurality of applications to interact and communicate with each other and a user according to the needs of said user, regardless of the platform of each of said plurality of applications;
  a social profile generation component for generating an interactive user profile of said user based on monitoring said user's interactions with one or more of said plurality of applications;
  a social community discovery component for discovering social communities with interest common to said user based on said interactive user profile;
  a social community creating component to generates a new social community based on said profile generated by said profile generation component, the creation of the new social community further being based in part upon interactions of a plurality of users using said plurality of applications; and
  a social community registration component for registering said user with said social community.

9. The interactive application system of claim 8, wherein said plurality of applications are stored in a computer readable medium on one of a personal computer, mobile devices, or Internet protocol enabled entertainment device.

10. The interactive application system of claim 8, wherein said social community creating component generates said new social community based on interactive user profiles of said plurality of users and registers said plurality of users with said social community.

11. The interactive application system of claim 8, wherein said social community registration component is further capable of presenting to said user a list of social communities discovered by said social community discovery component and permitting the user to select which of said social communities said user wishes to register with.

12. The interactive application system of claim 8, further comprising:
  a social community management component capable of determining which members of a social community are presently available and notifying said user of the availability of said members; and
  wherein at least one of said plurality of applications is capable of interacting with an application of at least one of said members determined to be available by said social community management component.

13. The interactive application system of claim 12, wherein said social community registration component automatically registers said user with said social communities discovered by said social community registration component.

14. The interactive application system of claim 8, wherein said social community discovery component is further capable of discovering a social community based on a search instigated by said user.

15. The interactive application system of claim 8, wherein at least one of said social profile generation component, social community discovery component, and social community registration component is stored in a computer-readable medium on a network server.

16. A method for interacting with members of a social community, the method comprising:
  generating an interactive profile of a user based on monitoring the applications and services said user interacts with;
  searching for a social community compatible with said interactive user profile;
  if a social community is not found, then generating a new social community based on said interactive profile and on interactions between said user and a plurality of users using a plurality of applications;
  joining said social community; and
  interacting with one or more members of said community through said plurality of applications regardless of the platform or network said applications are based on or located in.

17. The method of claim 16, wherein said interacting step comprises a user transmitting multimedia to said one or more members.

18. The method of claim 17, further comprising the step of translating said multimedia into a format capable of being read by said one or more members.

19. The method of claim 16, wherein said searching step is performed automatically by a mobile device belonging to said user.

20. The method of claim 16 wherein said searching step is performed by said user through either a mobile device or a web portal.

21. The method of claim 16, wherein said joining step comprises presenting said user with social communities discovered by said searching step and permitting said user to select which communities to join.

* * * * *